(12) United States Patent
Beresin (10) Patent No.: US 6,788,667 B1
(45) Date of Patent: Sep. 7, 2004

(54) WIRELESS ACCESS TO WIRED NETWORK AUDIO SERVICES USING MOBILE VOICE CALL

(75) Inventor: Evgenij Beresin, Helsinki (FI)

(73) Assignee: Nokia Corporation, Espoo (FI)

( * ) Notice: Subject to any disclaimer, the term of this patent is extended or adjusted under 35 U.S.C. 154(b) by 731 days.

(21) Appl. No.: 09/597,964

(22) Filed: Jun. 20, 2000

(51) Int. Cl.[7] ................................................ H04Q 7/24
(52) U.S. Cl. ....................... 370/338; 379/59; 455/426.1
(58) Field of Search ................................. 370/338, 341, 370/329, 264, 345, 431, 464, 352, 357, 389, 354, 310.1, 310.2, 328; 455/426.1, 450, 455, 445; 379/59, 900, 67.1, 88.17, 88.18, 88.22

(56) References Cited

U.S. PATENT DOCUMENTS

| | | | | |
|---|---|---|---|---|
| 6,125,113 A | * | 9/2000 | Farris et al. ................. | 370/389 |
| 6,363,065 B1 | * | 3/2002 | Thornton et al. ........... | 370/352 |
| 6,463,053 B1 | * | 10/2002 | Chen ........................... | 370/352 |
| 6,473,423 B1 | * | 10/2002 | Tebeka et al. ............... | 370/352 |
| 6,473,609 B1 | * | 10/2002 | Schwartz et al. ........... | 455/406 |
| 6,516,203 B1 | * | 2/2003 | Enzmann et al. .......... | 455/556.1 |
| 6,519,458 B2 | * | 2/2003 | Oh et al. ..................... | 455/445 |
| 6,549,612 B2 | * | 4/2003 | Gifford et al. .............. | 379/67.1 |
| 6,549,773 B1 | * | 4/2003 | Linden et al. ............ | 455/426.1 |
| 6,549,776 B1 | * | 4/2003 | Joong .......................... | 455/433 |
| 6,564,261 B1 | * | 5/2003 | Gudjonsson et al. ....... | 709/227 |
| 6,567,398 B1 | * | 5/2003 | Aravamudan et al. ...... | 370/352 |
| 6,594,484 B1 | * | 7/2003 | Hitchings, Jr. ........... | 455/414.1 |
| 2002/0080801 A1 | * | 6/2002 | Derks ......................... | 370/401 |

* cited by examiner

*Primary Examiner*—Wellington Chin
*Assistant Examiner*—Jamal A. Fox
(74) *Attorney, Agent, or Firm*—Cohen, Pontani, Lieberman & Pavane (57) ABSTRACT

A system and method permits a wireless communication terminal (such as a mobile telephone) to access Internet audio services. The wireless terminal communicates in WAP protocol to a WTA Internet server acting as a gateway between a mobile network and a wired network, and requests a channel to an audio service residing on a particular Internet origin server. The WTA server initiates establishment of an audio channel with the origin server. The WTA server also instructs the wireless terminal to answer automatically the next voice telephone call it receives, and the WTA server instructs the mobile network to place a voice phone call to the wireless terminal. The wireless terminal automatically answers, and there is then established a speech path from the wireless terminal, over the mobile network, through the WTA server, to the origin server. The wireless terminal may access the Internet audio service over this audio path.

20 Claims, 9 Drawing Sheets

WIRELESS ACCESS TO WIRED NETWORK AUDIO SERVICES USING MOBILE VOICE CALL

BACKGROUND OF THE INVENTION

1. Field of the Invention

The present invention relates to the use of wireless communication devices on computer wired networks, and particularly to using such devices to access network audio content or audio services.

2. Description of the Related Art

Traditional Internet usage relates primarily to text-based information. For example, conventional Internet "chat" services allow users to communicate by exchanging text messages which the users type in. A user selects a "chat room" and proceeds to exchange text messages with other users in the chat room.

Modern voice over Internet Protocol (VoIP) technologies allow people to use Internet connections for real-time voice conversation, or listening to streaming audio without significant delays in sound transmission. Such technologies are used to implement Internet voice chat services, allowing chatting in a more natural manner than conventional text chats. In order to use VoIP-based services, a user's PC is connected to the Internet by a wired network.

Mobile wireless devices (such as mobile phones) which weigh less than a pound and which can fit in a pocket have become common in recent years, allowing much greater flexibility and mobility for voice communications than desktop or even notebook PC's.

It is convenient for users of mobile devices to have mobile access to Internet services to which they have become accustomed on their PC's. Wireless Application Protocol (WAP) has emerged as an open standard for accessing Internet services from wireless devices. The WAP solution includes an intermediate server, the WAP Gateway, which connects mobile devices to the Internet. WAP is designed for browsing content and handling data transfers in a way analogous to standard Internet technology. Current implementations of WAP are oriented primarily toward textual information. Characteristics of currently used underlying bearers don't allow real-time transmission of audio through the WAP protocol. It would thus be advantageous to provide a system and method for managing audio data flow between an Internet VoIP-based audio server and a user's wireless device.

SUMMARY OF THE INVENTION

An object of the present invention is to provide a method of managing audio data flow between an Internet VoIP-based audio server and a user's wireless terminal supporting the WAP standard. The invention relies on the Wireless Telephony Application (WTA) specification which is part of the WAP standard. WTA extends WAP with an interface to mobile network telephony services, making it possible to use a voice phone call as an audio path between a user's terminal and an Internet audio server.

According to one aspect of the invention, the user initiates sending from the wireless terminal to a WTA Internet server a wireless session protocol (WSP) "Get" request identifying a service on an Internet audio server. The WTA server forwards the request to the audio server, which sets up a VoIP channel between itself and the WTA server. The WTA server sends the wireless terminal an instruction to automatically answer the next incoming voice call, and then places a voice call through the wireless network to the wireless terminal. Upon the wireless terminal's answering the voice call, a voice path is established from the wireless terminal over the wireless network to the WTA server and thence over the VoIP channel to the audio server. As a result, the user's wireless terminal is connected to the service provided by the Internet audio server.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PRESENTLY PREFERRED EMBODIMENTS

The invention will now be described in terms of an embodiment enabling a user of a wireless terminal to participate in an Internet voice chat.

Figure 1A:
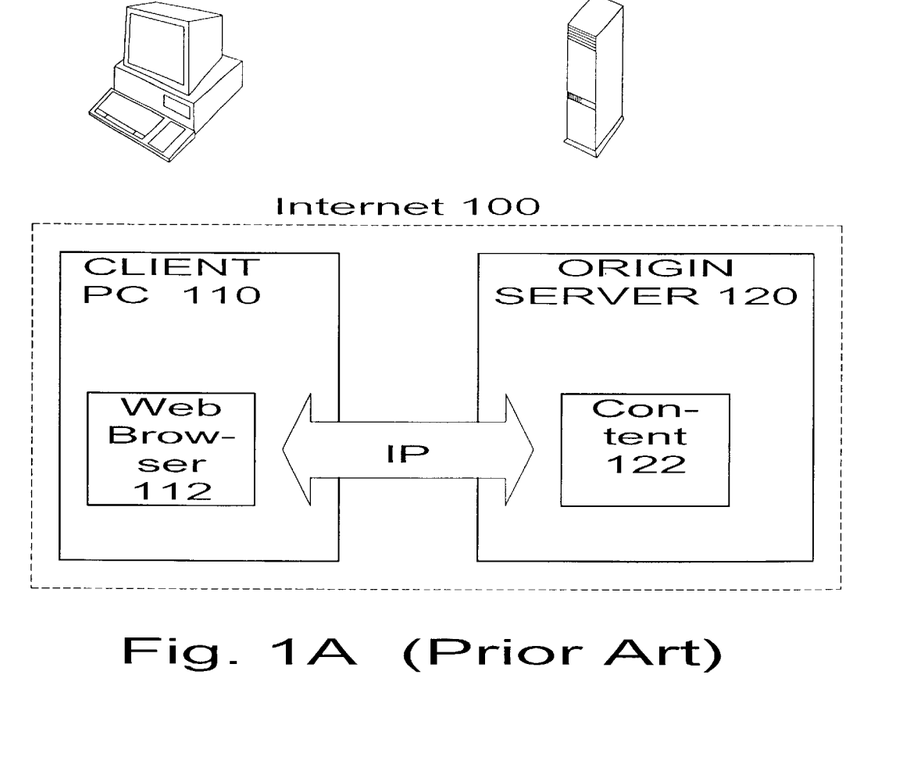
FIG. 1A (prior art) is a programming model of an Internet connection comprising a client PC and a server wherein a web browser in the PC is obtaining content from the server.

FIG. 1A depicts a conventional programming model of a typical Internet connection. A client PC 110 and an origin server 120 are in communication via Internet protocol (IP) and thus are both considered to be within Internet 100. As is known to those in the art, a web browser 112 in PC 110 interrogates content 122 in server 120. The server 120 might be a text-mode chat server, in which case content 122 is text of chat messages received from other users (not shown) at other PC's (not shown). Text messages from the user at PC 110 are forwarded to content 122 for further forwarding to those other users.

A network such as, for example, the Internet, may comprise many servers. Server 120 as depicted in a programming model is representative of the many real-world servers and can serve users with a great variety of different contents: for example, persistent data such as encyclopedia entries, volatile data such as stock market reports, and ephemeral data such as real-time speech utterances.

Figure 1B:
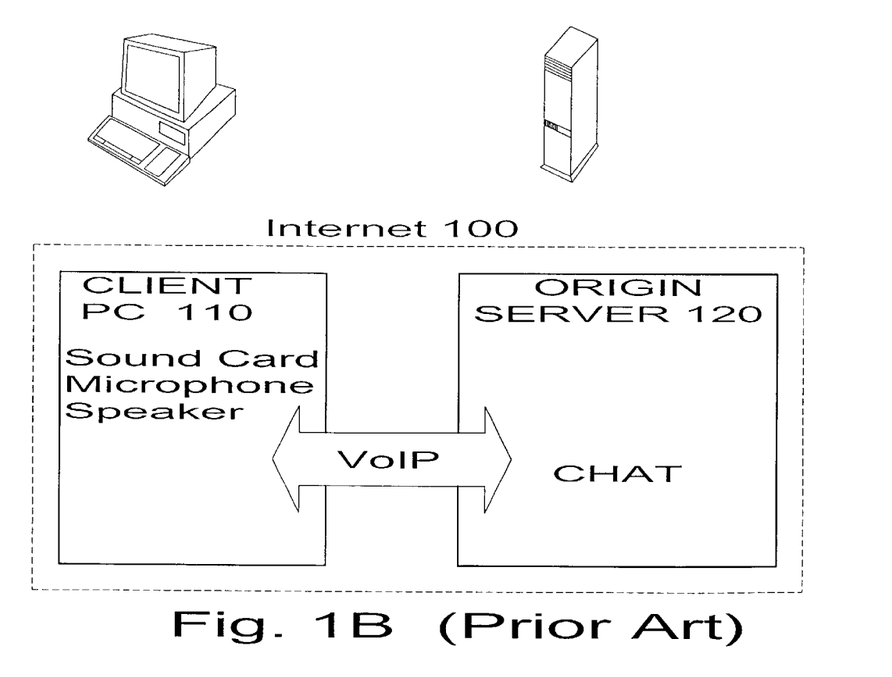
FIG. 1B (prior art) is a programming model of an Internet connection comprising a client PC and an origin server wherein a user at the PC is using audio facilities on the PC to participate in an Internet chat with other users (not shown) through the server which is functioning as a chat server.

FIG. 1B depicts another conventional programming model of a typical Internet connection for conducting an Internet chat in natural speech rather than in typed text messages. A client PC 110 is using its audio facilities (i.e., sound card, microphone, speaker, sound processing software) to forward speech uttered by a user (not shown) via voice-over-Internet protocol (VoIP) to the server 120, which is functioning as a chat server and receiving other speech utterances from other users (not shown) at other PC's (not shown) and forwarding the other users' utterances to the user at PC 110 via VoIP.

Although mobile telephones were developed to provide subscribers with voice telephone capability over the public switched telephone network (PSTN), mobile telephones have in recent years come to be equipped with small display screens for receiving short text messages, such as from the short message service (SMS), or email from the Internet. Wireless application protocol (WAP) has been developed for interfacing mobile telephones with the Internet.

Figure 2:
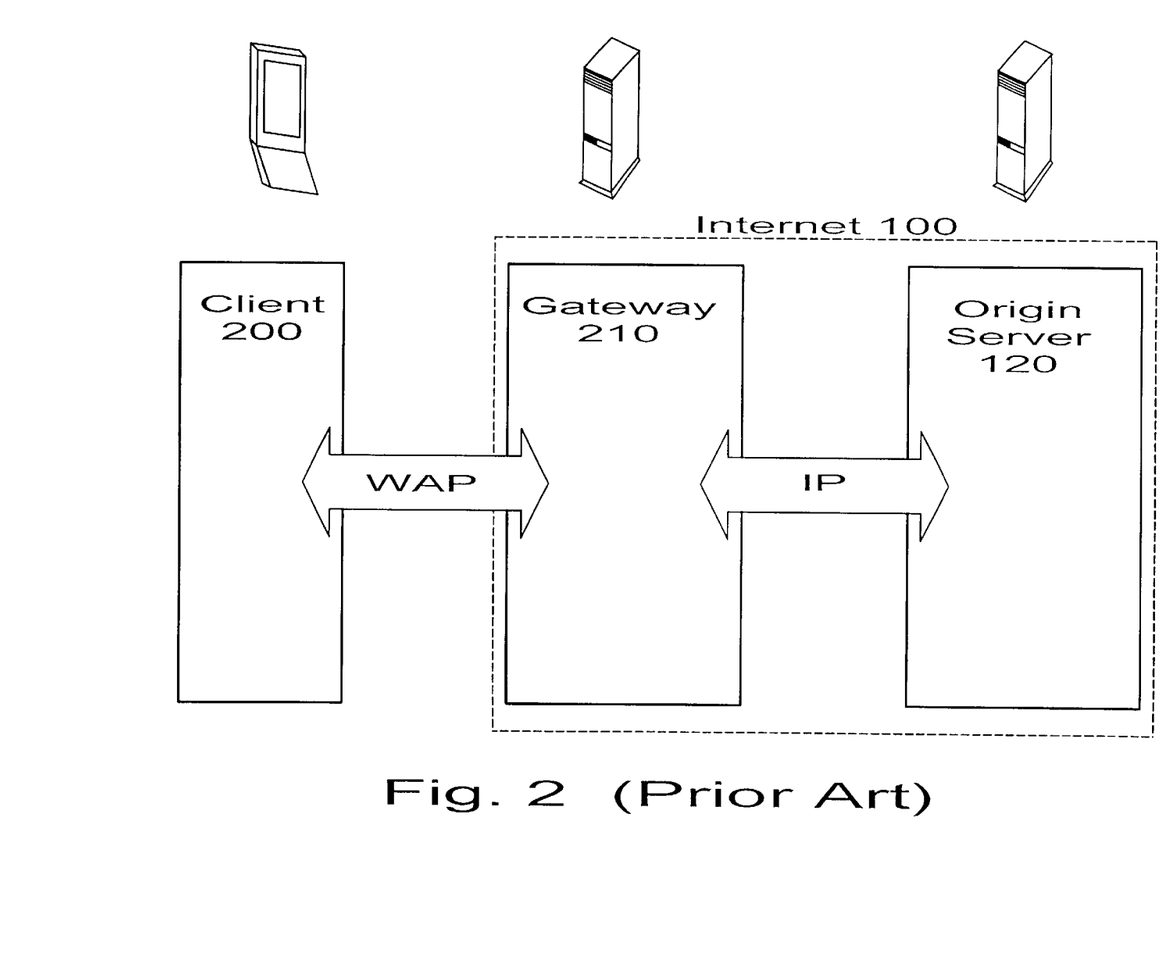
FIG. 2. (prior art) is a programming model of an Internet connection in which a user at a mobile terminal obtains textual content from a server.

The programming model for a mobile telephone thus interfaced to the Internet is given in FIG. 2. The primary role of client mobile telephone 200 is to communicate in voice through the PSTN (not shown). Through the PSTN, client mobile telephone 200 may communicate via WAP with gateway 210 of Internet 100. Gateway 210, in turn, communicates via IP with an origin server 120 of Internet 100. Server 120 may be, for example, a text chat server or an email server, either of which provides textual content to be forwarded through gateway 210 to client 200.

It is generally not feasible to use the programming model of FIG. 2 for enabling client 200 to participate in voice chats, because WAP evolved to incorporate mobile voice telephones into the sort of programming model given in FIG. 1A for textual data transfers. The effectiveness of WAP depends on the characteristics of the underlying bearer, and currently used bearers are not suitable for real-time audio data transmission via WAP protocols.

In accordance with the present invention, a voice chat is implemented via WAP by exploiting a normal voice phone call as a speech path between a user's mobile device and an Internet voice chat server. The WAP environment includes the Wireless Telephony Application (WTA) framework which the present invention adapts to extend voice chat to a mobile user.

Figure 3:
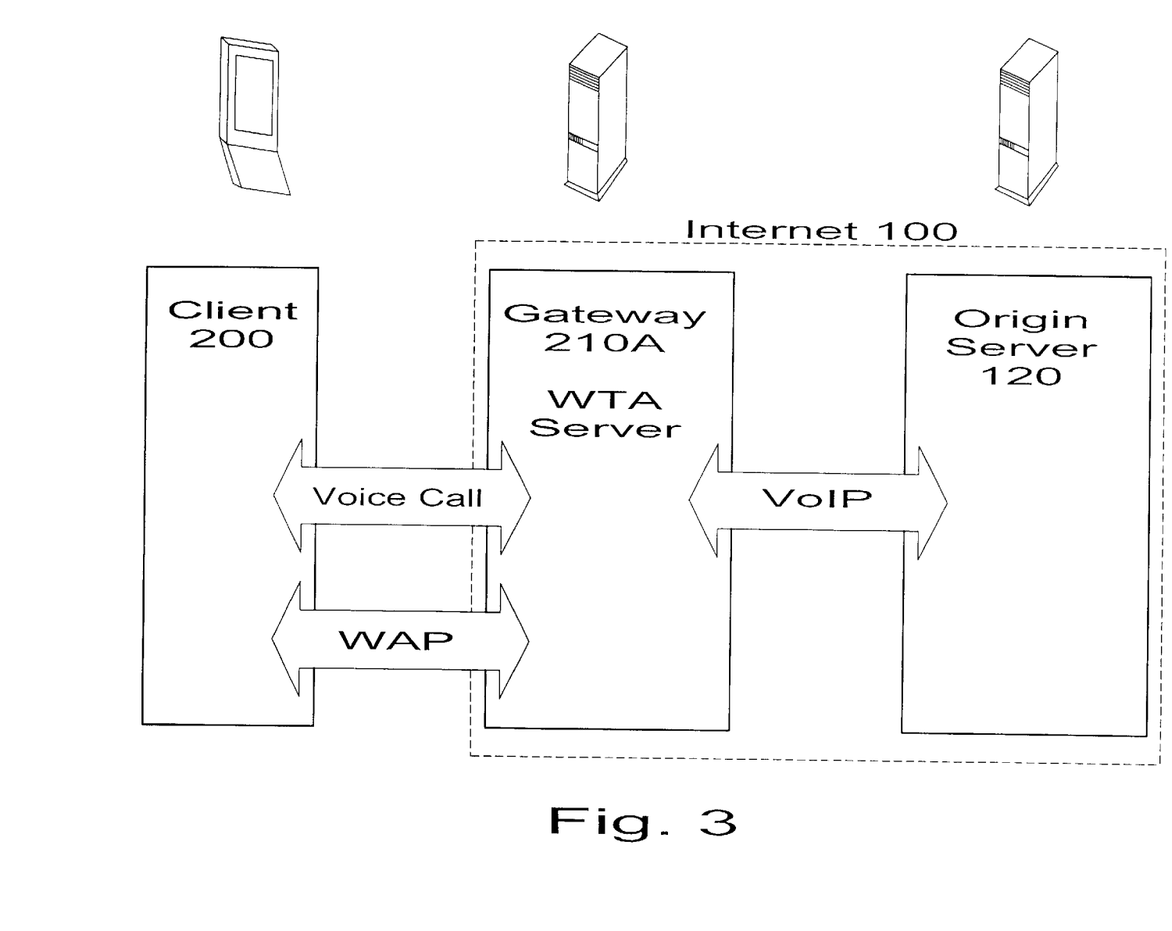
FIG. 3 is a programming model of a mobile terminal engaged in an Internet voice chat according to the present invention.

A programming model of voice chat according to the present invention is given in FIG. 3. The generalized gateway 210 depicted in FIG. 2 is in particular a WTA server 210A in FIG. 3. WTA server 210A communicates with a client mobile device 200 through WAP, and also through voice telephone calls via the mobile telephone network portion of the PSTN (not shown).

Figure 4A:
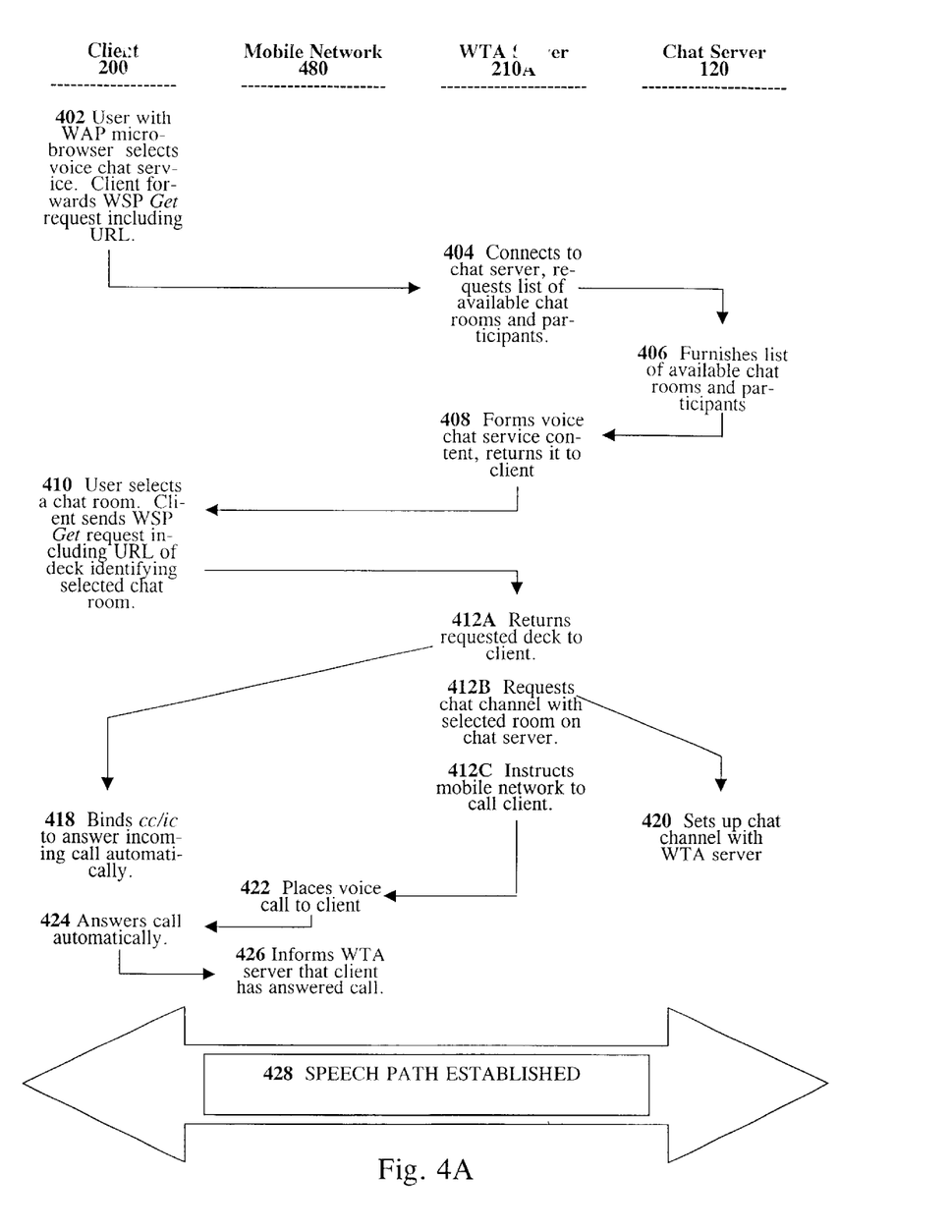
FIG. 4A illustrates control and data flow for engaging a mobile terminal in an Internet voice chat according to the present invention.

FIG. 4A shows flow of data and control that occurs when a mobile client 200 participates in an Internet voice chat according to the present invention. In Block 402, a user of mobile client 200 connected to gateway 210 via WAP uses a microbrowser (known in the prior art and not shown) to select a voice chat service Uniform Resource Locator (URL). Client 200 sends a Wireless Session Protocol (WSP) Get request (known in the prior art) to WTA server 210A. The selected URL is the argument of the WSP Get request. In Block 404, the WTA server 210A connects to the voice chat server 120, and requests a list of available chat rooms and chat participants. In Block 406, chat server 120 sends to WTA server 210A the list that WTA server 210A requested in block 404. In Block 408, WTA server 210A forms the list of chat rooms and participants into voice chat service content, and returns it to client 200. In Block 410, voice chat content is presented by client 200 to the user, who selects a chat room. From the user's request, client 200 forms another WSP Get request, which requests a "deck" specifying the selected chat room. Decks are known to those in the art; a deck is a group of one or more "cards"; a card is a single unit of Wireless Markup Language (WML) navigation or user interface. The deck is identified by a uniform resource locator (URL).

In Block 412A, WTA server 210A receives the Get request, and returns the requested deck. It contains but a single card, which instructs client 200 to bind the incoming call event (cc/ic) so that an ensuing call will be answered automatically (block 418). In Block 412B, WTA server 210A requests chat server 120 to set up chat channel with WTA server 210A. In Block 412C, WTA server 210A requests mobile network 480 to place a voice call to client 200. In Block 418, in response to the Get request received in block 412A, client 200 binds the incoming call event cc/ic to automatically answer an ensuing voice call. In Block 420, in response to the request received from block 412C, chat server 120 sets up a chat channel with WTA server 210A. This will be part of the overall speech path to be discussed in connection with block 428. In Block 422, mobile network 480, as instructed in WTA server 210 in block 412C, places a voice call to client 200. In Block 424, client 200, having its cc/ic bound as discussed above to answer an incoming call automatically, answers the incoming voice call. In Block 426, mobile network 480 informs WTA server 210A that client 200 has answered the call. In Block 428, a two-way speech path is now established from client 200 via a voice call path through mobile network 480 to WTA server 210A and a chat channel from WTA server 210A to chat server 120. A user of client 200 engages in an Internet voice chat.

Figure 4B:
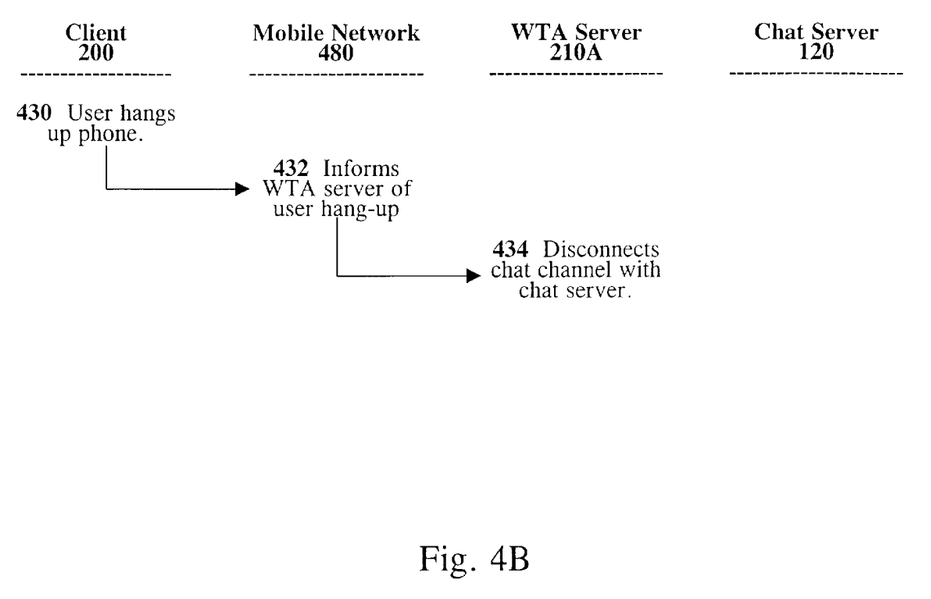
FIG. 4B illustrates control and data flow for disengaging a mobile terminal from an Internet voice chat according to the present invention.

Termination of the Internet voice chat is discussed in FIG. 4B. In Block 430, the user of client 200 places the phone in an on-hook condition. In Block 432, mobile network 480 informs WTA server 210A that the user has hung up. Mobile network 480 is no longer carrying the portion of the speech path it carried in block 428. In Block 434, WTA server 210A disconnects the chat channel it had with chat server 120. None of the speech path that existed in block 428 still exists.

Figure 5A:
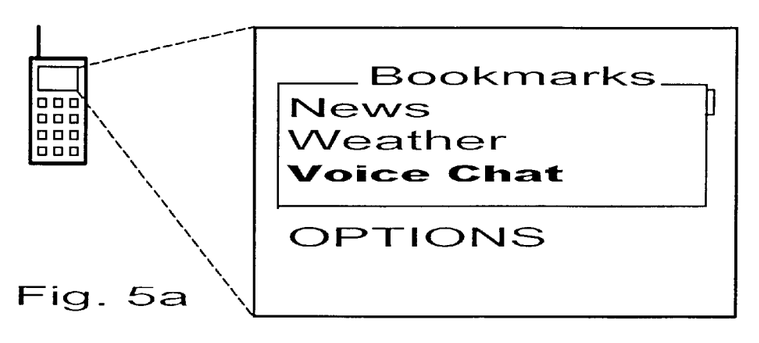
FIGS. 5a through 5i depict the displays appearing on a mobile terminal while a user enters, participates in, and leaves a voice chat according to the present invention.
Figure 5B:
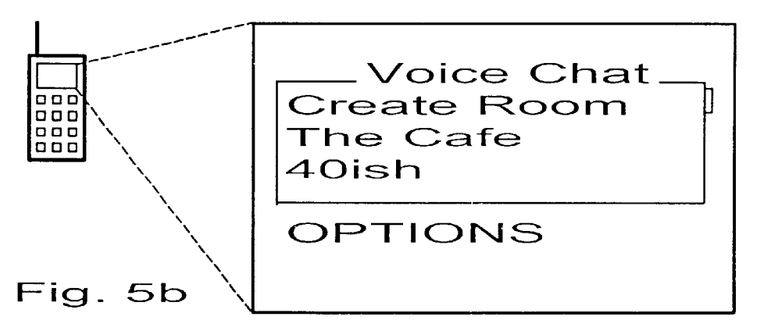
Figure 5C:
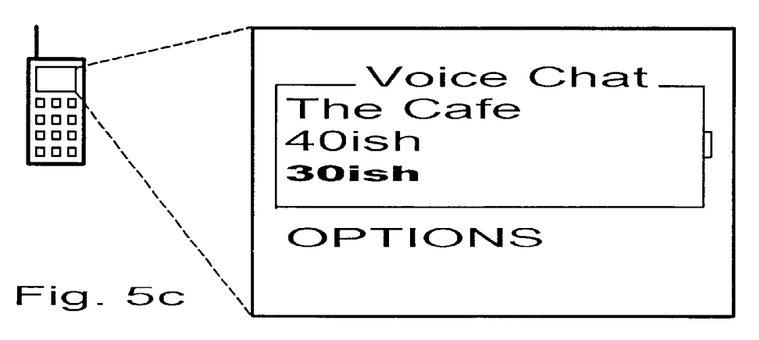
Figure 5D:
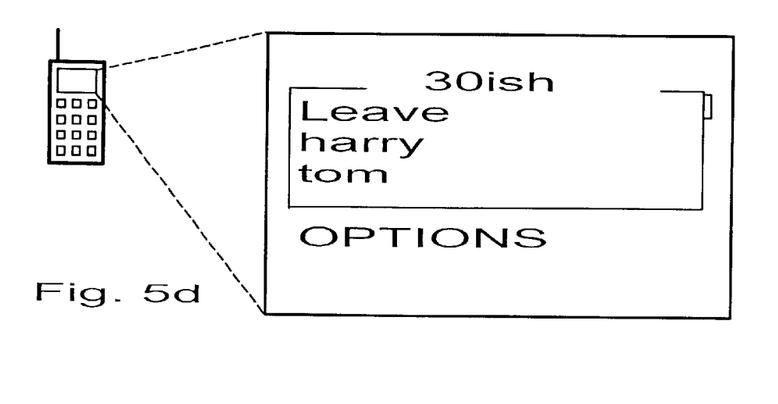

FIGS. 5a through 5i depict a scenario of displays on terminal 200 while a user is entering, participating in, and leaving a voice chat. In FIG. 5a terminal 200 displays a scrollable list of options to the user, one of which is "Voice Chat", the selection of which leads to the display shown in FIG. 5b, including the "Create Room" option to create a new chat room, and the names of present chat rooms obtained from a chat server as discussed above. Scrolling the scrollable list (by means well known and not discussed here) makes visible a chat room named "30ish" as shown in FIG. 5c. The user selects that chat room and is shown the display of FIG. 5d, which ID contains the option to "Leave" the chat room, and a scrollable list of nicknames of participants in the chat as obtained from the chat server as described previously.

Figure 5E:
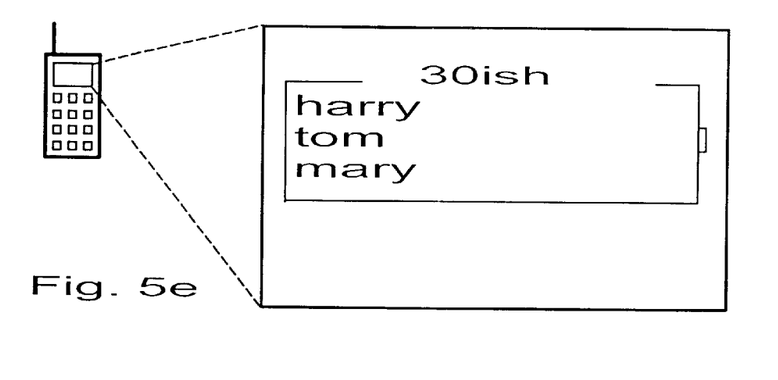
Figure 5F:
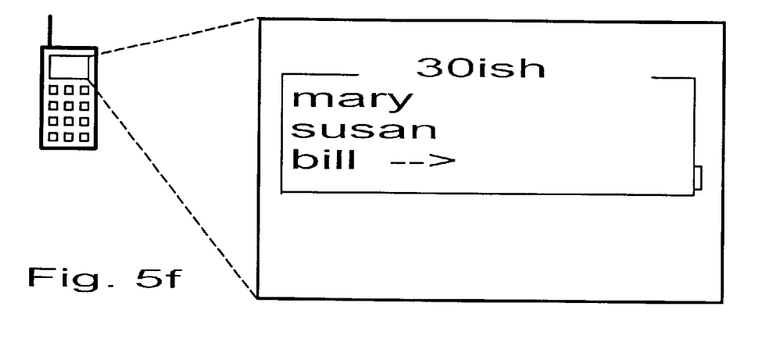
Figure 5G:
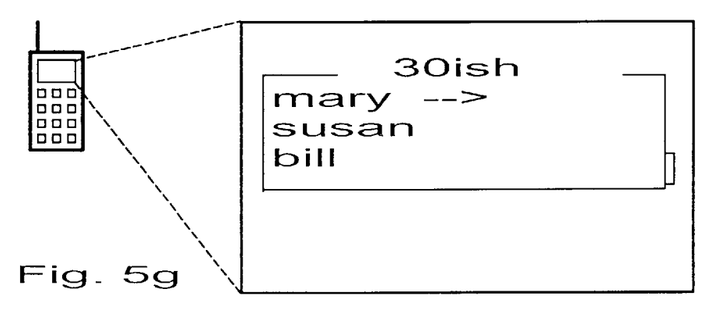

The user may scroll down the scrollable list to see all the participants in the chat, as shown in FIGS. 5e and 5f. Assuming the user to be named Mary, she sees her own name appear in the chat that she has joined. As shown in FIG. 5f, the name of the person currently speaking has a distinctive symbol next to it. As seen in FIG. 5g, when Mary begins to speak the distinctive symbol is next to her name.

Figure 5H:
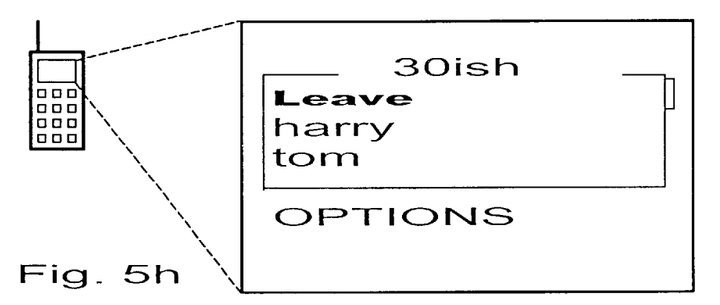
Figure 5I:
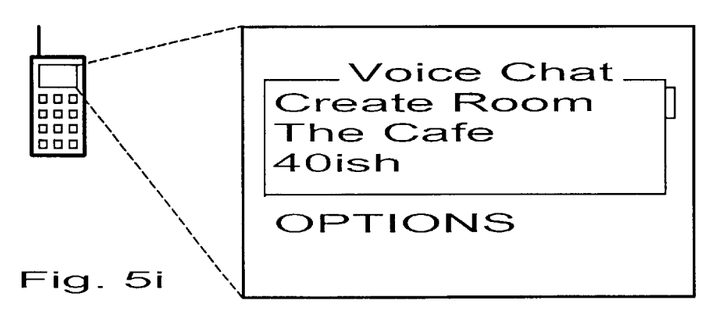

In FIG. 5h the user has scrolled up to reveal the "Leave" option, and selects it. (The user could also have left the chat by placing terminal 200 in an on-hook condition.) As shown in FIG. 5i, the display reverts to what it was in FIG. 5b before a chat was selected.

Although the embodiment described refers to VoIP standard as a base technology for Internet audio servers, it is to be understood that VoIP can be replaced by any other solution allowing network audio transmission, and the Internet can be replaced by any other computer wired network.

Although the described embodiment relates to WAP standard, it is to be understood that the method is applicable in the context of any other solution for wireless access to wired networks, which would combine the ability to browse network content with the ability to arrange mobile voice calls from network sites.

Although the described embodiment is explained in relation to voice chat services, it is to be understood that the system and method can be utilized for wireless access to network audio services of any kind, including streaming audio, Internet telephony, broadcasting, or voice chats.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of wireless access to a wired-network-based audio service from a wireless terminal, comprising the steps of:
    (a) sending, from the wireless terminal in a wireless network to a network gateway server, a request identifying an audio service residing on an origin server in a wired network;
    (b) sending, from the network gateway server to the origin server, a request for an audio channel to the audio service;
    (c) setting up in the origin server the requested audio channel between the origin server and the network gateway server in the wired network;
    (d) sending, from the network gateway server to a mobile network, an instruction to place a mobile voice call in the wireless network between the wireless terminal and the network gateway server;
    (e) sending notification from the mobile network that the wireless terminal has answered the voice call; and
    (f) performing, in the network gateway server, digital conversion of audio data flow formats between the mobile voice call in the wireless network and the audio channel in the wired network, wherein a speech path is established from the wireless terminal through the mobile voice call to the network gateway server and from the network gateway server through the audio channel to the audio service on the origin server over which audio transmission may take place.

2. The method of claim 1, wherein following the step (c) is a step:
    (c1) sending from the network gateway server to the wireless terminal an instruction to answer automatically a next incoming voice call.

3. The method of claim 1, further comprising the steps:
    (g) sending an indication from the wireless network to the network gateway server when a user who was using the audio service places the wireless terminal in an on-hook condition; and
    (h) initiating from the network gateway server a disconnection of the audio channel with the audio service on the origin server.

4. The method of claim 1, wherein:
the wired network is the Internet.

5. The method of claim 4, wherein the audio channel between the network gateway server and the origin server is a VoIP channel.

6. The method of claim 4, wherein:
    the wireless terminal is compliant with Wireless Application Protocol (WAP);
    the network gateway server is a wireless Telephony Application (WTA) server; and
    the request sent from the wireless terminal to the network gateway server is the Wireless Session Protocol (WSP) get request with uniform resource locator (URL) argument identifying the audio service on the origin server.

7. The method of claim 1, wherein the audio service is a voice chat service.

8. The method of claim 1, wherein the audio service is a streaming audio service.

9. The method of claim 1, wherein the audio service is a network telephony service.

10. The method of claim 1, wherein the audio service is a network broadcasting service.

11. Apparatus for wireless access to a wired-network-based audio service from a wireless terminal, comprising:
    a network gateway server;
    an origin server in a wired network;
    means for sending, from the wireless terminal in a wireless network to the network gateway server, a request identifying an audio service residing on the origin server;
    means for sending, from the network gateway server to the origin server, a request for an audio channel to the audio service;
    audio communication means in the origin server for providing the requested audio channel between the origin server and the network gateway server in the wired network;
    means for sending, from the network gateway server to a mobile network, an instruction to place a mobile voice call in the wireless network between the wireless terminal and the network gateway server;
    means in the mobile network for providing notification that the wireless terminal has answered the voice call; and
    conversion means in the network gateway server for performing digital conversion of audio data flow formats between the mobile voice call in the wireless network and the audio channel in the wired network, wherein a speech path is established from the wireless terminal through the mobile voice call to the network gateway server and from the network gateway server through the audio channel to the audio service on the origin server over which audio transmission may take place.

12. The apparatus of claim 11, further comprising means for sending from the network gateway server to the wireless terminal an instruction to answer automatically a next incoming voice call.

13. The apparatus of claim 11, further comprising:

means for sending an indication from the wireless network to the network gateway server when a user who was using the audio service places the wireless terminal in an on-hook condition; and means in the network gateway server for disconnecting the audio channel with the audio service on the origin server.

14. The apparatus of claim 11, wherein:

the wire network is the Internet.

15. The apparatus of claim 14, wherein the audio channel between the network gateway server and the origin server is a VoIP channel.

16. The apparatus of claim 14, wherein:

the wireless terminal is compliant with Wireless Application Protocol (WAP);

the network gateway server is a Wireless Telephony Application (WTA) server; and the request sent from the wireless terminal to the network gateway server is the Wireless Session Protocol (WSP) Get request with uniform resource locator (URL) argument identifying the audio service on the origin server.

17. The apparatus of claim 11, wherein the audio service is a voice chat service.

18. the apparatus of claim 11, wherein the audio service is a streaming audio service.

19. The apparatus of claim 11, wherein the audio service is a network telephony service.

20. The apparatus of claim 11, wherein the audio service is a network broadcasting service.

* * * * *